US006896952B2

(12) United States Patent
Calland

(10) Patent No.: US 6,896,952 B2
(45) Date of Patent: May 24, 2005

(54) INK-RECEPTOR SHEET FOR USE AS A RECORDING MATERIAL

(75) Inventor: Stevan George Calland, Glossop (GB)

(73) Assignee: Arjo Wiggins Fine Papers Limited (GB)

( * ) Notice: Subject to any disclaimer, the term of this patent is extended or adjusted under 35 U.S.C. 154(b) by 0 days.

(21) Appl. No.: 09/889,608

(22) PCT Filed: Jan. 27, 2000

(86) PCT No.: PCT/GB00/00202

§ 371 (c)(1),
(2), (4) Date: Feb. 4, 2002

(87) PCT Pub. No.: WO00/44568

PCT Pub. Date: Aug. 3, 2001

(65) Prior Publication Data

US 2004/0228985 A1 Nov. 18, 2004

(30) Foreign Application Priority Data

Jan. 28, 1999 (GB) ............................................ 9901750

(51) Int. Cl.[7] ............................ B32B 3/00; B32B 5/16; B32B 7/00

(52) U.S. Cl. ....................................... 428/206; 399/130

(58) Field of Search ........................... 428/206; 399/130

(56) References Cited

U.S. PATENT DOCUMENTS 5,593,489 A 1/1997 Wu ........................... 106/464
5,902,453 A * 5/1999 Ruch ......................... 162/135
6,685,999 B2 * 2/2004 Ichinose et al. ......... 428/32.25

FOREIGN PATENT DOCUMENTS

| | | | |
|---|---|---|---|
| EP | 0164 196 | A1 | 12/1985 |
| EP | 0423 829 | A1 | 4/1991 |
| EP | 0487 350 | A1 | 5/1992 |
| EP | 0673 779 | A1 | 9/1995 |
| EP | 0705 704 | A2 | 4/1996 |
| EP | 0734 881 | A1 | 10/1996 |
| EP | 0879 917 | A2 | 11/1998 |
| EP | 0887 199 | A2 | 12/1998 |
| EP | 1 090 776 | A1 | 4/2001 |
| GB | 2 147 003 | A | 5/1985 |
| GB | 2 301 844 | A | 12/1996 |
| GB | 2 301 845 | A | 12/1996 |
| WO | WO 96/06384 | | 2/1996 |

OTHER PUBLICATIONS

Patent Abstracts of Japan—JP 09 290556 (Mitsubishi Paper Mills).
Patent Abstracts of Japan—JP 61 043593 (Mitsubishi Paper Mills).

* cited by examiner

*Primary Examiner*—B. Shewareged
(74) *Attorney, Agent, or Firm*—Fay, Sharpe, Fagan, Minnich & McKee, LLP

(57) ABSTRACT

A recording sheet for use on a digital press includes either insoluble aluminium trihydrate in the base paper or magnesium sulphate at the surface. According to a second aspect of the invention, the recording sheet includes a paper substrate having a surface treatment including a water soluble cationic substance and a water soluble binder substance.

11 Claims, No Drawings

INK-RECEPTOR SHEET FOR USE AS A RECORDING MATERIAL

The present invention relates to a recording medium and in particular, but not exclusively, to a plain paper recording medium for use with the Indigo™ digital printing press.

The Indigo digital press made by Indigo NV requires special paper surfaces to enable complete toner/ink transfer from printing blanket to paper. Such complete transfer is essential to allow variable information to be printed on successive sheets.

It is known that commercially available pigment coated printing papers satisfy the requirement of 100% toner transfer, however for aesthetic and cost reasons printers wish to use papers of uncoated appearance. For instance: a translucent or semi-translucent paper would have its translucency diminished by pigment coating; coated papers are often glossy; the surface texture of an uncoated paper feels more natural.

Two processes have been developed to treat paper to render it suitable for the Indigo press. One developed by Indigo NV and described in International patent application WO96/06384 is commercially known as the Sapphire treatment and involves treating the paper with polyethylene imine. That developed by Arjo Wiggins and described in EP 0879917 A2 involves use of a surface treatment that includes an aluminate salt or a salt of a weak acid/strong base to render the surface alkaline.

It is an object of the present invention to provide a paper or a range of papers of uncoated appearance that are suitable for use on an Indigo press and also in other digital and non-digital processes, and which also have an increased shelf life.

According to one aspect of the invention there is provided a recording sheet for use on a digital press, the recording sheet including a paper substrate containing an insoluble mineral filler including a Lewis acid. The recording sheet may, for example, contain aluminium trihydrate ($Al(OH)_3$). The recording medium may be an opaque paper including a surface treatment, for example polyvinyl pyrrolidone and magnesium sulphate or starch plus polyvinyl alcohol (PVOH).

Advantageously, the paper substrate contains between 50 and 400, preferably between 100 and 300, more preferably approximately 200 parts dry weight of aluminium trihydrate to 800 parts dry weight of pulp.

Advantageously, the recording sheet has a surface treatment including magnesium sulphate and polyvinyl pyrrolidone. The surface treatment may be applied to the paper at a rate of 2 to 4 $g/m^2$.

Advantageously, the recording sheet has a surface treatment including starch and polyvinyl alcohol. The surface treatment may include an optical brightening agent. The surface treatment may be applied to the paper at a rate of 1 to 2 $g/m^2$.

Advantageously, the recording sheet has a surface treatment including a soluble or insoluble metal from Groups II and III or the Transition Metals of the Periodic Table.

Advantageously, the recording sheet is substantially opaque.

According to another aspect of the invention there is provided a method of printing on a recording sheet using a digital printing press, characterised in that the recording sheet is as defined in any one of the preceding paragraphs.

According to another aspect of the invention there is provided a method of manufacturing a recording sheet for use on a digital press, the method including making up a slurry in water containing paper pulp and aluminium trihydrate, and forming the slurry into a web of paper on a paper machine.

Advantageously, the slurry contains between 50 and 400, preferably between 100 and 300, more preferably approximately 200 parts dry weight of aluminium trihydrate to 800 parts dry weight of pulp.

Advantageously, the method includes treating the surface of the paper with a surface treatment including magnesium sulphate and polyvinyl pyrrolidone, which surface treatment may be applied to the paper at a rate of 2 to 4 $g/m^2$.

Advantageously, the method including treating the surface of the paper with a surface treatment including starch and polyvinyl alcohol, which surface treatment may include an optical brightening agent and may be applied to the paper at a rate of 1 to 2 $g/m^2$.

Advantageously, the surface treatment including magnesium sulphate and polyvinyl pyrrolidone and the surface treatment including starch and polyvinyl alcohol are applied to the paper as separate treatments.

In a preferred embodiment, the invention is characterised by the presence of insoluble aluminium in the base and/or magnesium sulphate at the paper surface. The paper of the present invention is intended primarily for printing on an Indigo digital printing press. We have found that the use of an insoluble aluminium filler in the base makes the paper suitable for use in the Indigo press without the need for any special surface treatment. The paper is also suitable for use in the Xeikon digital printing press. Further, the paper has universal applicability, making it suitable for litho, inkjet, laser (mono and colour) printers and fountain pens. It has the aesthetic appearance of an uncoated paper, which gives it an advantage over some other Indigo printable papers that are of coated appearance. The coated papers that perform well in Indigo are usually designed primarily for litho and do not give good inkjet performance, so are not universal.

According to another aspect of the present invention there is provided a recording medium for use on a digital printing press (for example the Indigo press), the recording medium including a paper substrate having a surface treatment of a water-soluble cationic substance and a water-soluble binder. For example, the recording medium may comprise a translucent paper with a surface treatment of polyvinyl pyrrolidone (PVP) and magnesium sulphate ($MgSO_4$) with a synthetic sizing agent, for example Baysynthol KSN B. This formula has none of the drawbacks of available Indigo pre-treatments.

According to another aspect of the present invention there is provided a method of manufacturing a recording sheet for use on a digital press, the method including treating the surface of a paper substrate with a surface treatment including a water soluble cationic substance and a water soluble binder substance.

Embodiments of the invention will now be described by way of example.

We have found that three things work particularly effectively:

1. Translucent paper with a surface treatment of polyvinyl pyrrolidone+magnesium sulphate+Baysynthol KSN synthetic sizing agent.
2. Opaque paper with an insoluble mineral filler of aluminium trihydrate (Martifill) and a surface treatment of polyvinyl pyrrolidone+$MgSO_4$.
3. Opaque paper with an insoluble mineral filler of aluminium trihydrate and a conventional paper surface treatment, e.g. starch plus polyvinyl alcohol.

The results of using the above formulae are summarised in the following table:

| Printability | Indigo | Litho | Inkjet inc. pigment inks | Hotmelt Inkjet | Laser (mono & colour) | Fountain pen |
|---|---|---|---|---|---|---|
| Formula 1 | yes | yes | yes | yes | yes | yes |
| Formula 2 | yes | yes | yes | yes | yes | yes |
| Formula 3 | yes | yes | yes | yes | yes | yes |

The surface treatment in formulae 1 and 2 is the same as the one we claimed for pigment based ink-jet on translucent paper, described in patent GB 2 301 845 B the contents of which are incorporated by reference herein. Formula 2 also includes aluminium trihydrate as a filler in the base, in addition to the surface treatment.

It would seem that the Baysynthol is not essential for the Indigo process. The suitability of the paper for use in the Indigo process appears to depend on either the presence of either a soluble metal cation ($Mg^{2+}$) at the surface or a Lewis acid filler ($Al(OH)_3$) in the base or a slightly "tacky" polymer such as polyvinyl pyrrolidone or polyvinyl alcohol at the surface of the paper. We suspect that the group II or III metals are the key. Further investigation of this aspect of the invention is required.

The preferred surface formulation for 1 and 2 is:

| | parts by dry weight | e.g. |
|---|---|---|
| magnesium sulphate | 75 | |
| polyvinyl pyrrolidone | 25 | Luviskol K90 |
| Styrene copolymer size | 0 to 2.5 | Baysynthol KSN B |
| Typical application weight: | 0.5 to 5 g/$m^2$ | |

The styrene copolymer size is not essential in the formulation for formula 2 (opaques) but is needed in formula 1 (translucent papers).

Variants of the formulae, for example as described in GB 2 301 845B are possible. For example:

| | |
|---|---|
| cation: | polyvalent metals ions of groups II and III and transition metals of the periodic table |
| cation: | poly quaternary amine or other Lewis acids |
| Binder: | starch, cationic starch, carboxymethyl cellulose, gelatine, polyvinyl alcohol, polyvinyl pyrrolidone, singly or in admixture of 2 or more |

-continued

| | |
|---|---|
| Base: | opacity 20 to 98+, grammage 40 to 300 |
| Size: | styrene maleic anhydride, polyacrylate, styrene acrylate or other sizes known in the art |

Formulation for Base for 2 and 3

Aluminium hydroxide aka trihydrate (e.g. Martifill P2) 18% on dry fibre.

Possible variants include the internal sizes and different particle size of filler.

| Surface formulation for 3 | |
|---|---|
| Starch | 200 dry parts e.g. oxidised potato - Amylox P45 from Avebe |
| Polyvinyl alcohol | 25 dry parts e.g. gohsenol GL05 from Nippon Gohsei |

Possible variants include cationic starch, other starches, different PVOHs.

For increased sheet brightness, an optical brightening agent (OBA) may be included in the surface treatment. We have found that it is beneficial to split the surface treatment into two applications: a) starch plus polyvinyl alcohol plus OBA and then b) magnesium sulphate plus polyvinyl pyrrolidone. The effect of this is to separate application of OBA and magnesium sulphate, which can react with each other and so mutually interfere with the desired function of each.

An example of a process for making a recording sheet according to a preferred embodiment of the invention will now be described. A papermaking stock slurry in water was made from 800 parts dry weight of commercial bleached chemical pulp and 200 parts dry weight of Martifill P2 aluminium trihydrate (available from Martinswerk GmbH). To this was added 2 parts dry weight of alkyl ketene dimer to serve as an internal sizing agent. Retention aids, dyes and optical brightening agents may also be added to suit the particular paper making process and the desired paper aesthetics.

The stock slurry was formed into a web of paper on a Fourdrinier paper machine. Other formers would also serve.

A first surface application was applied to the paper comprising an aqueous mix of (by dry weight parts) 50 parts Amylox P45 oxidised potato starch (available from Avebe b.a.) and 25 parts of Gohsenol GL05 polyvinyl alcohol (available from Nippon Gohsei). To this may be added an optical brightening agent to suit the desired aesthetic properties of the paper. This mix was applied to the paper at a rate of 1 g/$m^2$ to 2 g/$m^2$.

A second surface application was applied to the paper comprising an aqueous mix of (by dry weight parts) 75 parts of magnesium sulphate and 25 parts of Luviskol K90 polyvinyl pyrrolidone (available from BASF GmbH). This mix was applied to the paper at a rate of 2 g/$m^2$ to 4 g/$m^2$.

The finished paper had an attractive, uncoated appearance and was found to give good results on the Indigo digital printing press, as well as in the Xeikon digital printing press and with litho, inkjet, mono and colour laser printers and fountain pens. The paper therefore has universal applicability.

I claim:

1. Use of a recording sheet in a digital printing process, said use including the steps of:

providing a recording sheet that includes a paper substrate containing an insoluble mineral filler, said filler including aluminium trihydrate, loading the recording sheet into a digital printing press, and printing onto the recording sheet using a digital printing process that includes transferring liquid toner onto the recording sheet by electrophotography.

2. Use of a recording sheet according to claim 1, wherein the paper substrate comprises between 50 and 400 parts dry weight of aluminium trihydrate to 800 parts dry weight of pulp.

3. Use of a recording sheet according to claim 1, wherein the recording sheet has a surface treatment including magnesium sulphate and polyvinyl pyrrolidone.

4. Use of a recording sheet according to claim 3, wherein the surface treatment including magnesium sulphate and polyvinyl pyrrolidone is applied to the paper at a rate of 2 to 4 $g/m^2$.

5. Use of a recording sheet according to claim 1, wherein the recording sheet has a surface treatment including starch and polyvinyl alcohol.

6. Use of a recording sheet according to claim 5, wherein the surface treatment including starch and polyvinyl alcohol includes an optical brightening agent.

7. Use of a recording sheet according to claim 5, wherein the surface treatment including starch and polyvinyl alcohol is applied to the paper at a rate of 1 to 2 $g/m^2$.

8. Use of a recording sheet according to claim 1, wherein the recording sheet has a surface treatment including a soluble or insoluble metal from Groups II and III or the Transition Metals of the Periodic Table.

9. Use of a recording sheet according to claim 1, wherein the recording sheet is substantially opaque.

10. Use of a recording sheet according to claim 1, wherein the paper substrate comprises between 100 and 300 parts dry weight of aluminium trihydrate to 800 parts dry weight of pulp.

11. Use of a recording sheet according to claim 1, wherein the paper substrate comprises approximately 200 parts dry weight of aluminium trihydrate to 800 parts dry weight of pulp.

* * * * *